(12) United States Patent
Thompson et al.

(10) Patent No.: US 9,875,667 B2
(45) Date of Patent: Jan. 23, 2018

(54) METHOD AND APPARATUS FOR UTILIZING CONTROL POINTS TO MANAGE A USER TO A DESIRED STATE

(71) Applicant: URXmobile System, Inc., San Francisco, CA (US)

(72) Inventors: David Thompson, San Francisco, CA (US); Roy David Albert, San Francisco, CA (US)

(73) Assignee: URXmobile System, Inc., Mountain View, CA (US)

( * ) Notice: Subject to any disclaimer, the term of this patent is extended or adjusted under 35 U.S.C. 154(b) by 19 days.

(21) Appl. No.: 13/945,681

(22) Filed: Jul. 18, 2013

(65) Prior Publication Data
US 2014/0023998 A1    Jan. 23, 2014

Related U.S. Application Data

(60) Provisional application No. 61/673,189, filed on Jul. 18, 2012.

(51) Int. Cl.
*G09B 7/00*     (2006.01)
*G09B 19/00*    (2006.01)
*G09B 5/00*     (2006.01)

(52) U.S. Cl.
CPC .............. *G09B 19/00* (2013.01); *G09B 5/00* (2013.01)

(58) Field of Classification Search
CPC ........................................................ G09B 7/00
USPC ....................................................... 434/236
See application file for complete search history.

(56) References Cited

U.S. PATENT DOCUMENTS

| | | | |
|---|---|---|---|
| 5,377,258 A | 12/1994 | Bro | |
| 2007/0003914 A1* | 1/2007 | Yang | G06F 9/4446 434/236 |
| 2007/0072156 A1 | 3/2007 | Kaufman et al. | |
| 2007/0122780 A1 | 5/2007 | Moon et al. | |
| 2011/0153350 A1 | 6/2011 | Simons-Nikolova et al. | |
| 2011/0161107 A1* | 6/2011 | Goldberg et al. | 705/3 |
| 2011/0256517 A1* | 10/2011 | Swanson | G09B 19/00 434/236 |

OTHER PUBLICATIONS

MSDN: Designing Mobile Applications, Web Archive, Web. Apr. 20, 2012, available at <https://web.archive.org/web/20120420102043/http://msdn.microsoft.com/en-us/library/ee658108.aspx>.*

(Continued)

*Primary Examiner* — Thomas Hong
(74) *Attorney, Agent, or Firm* — J D Harriman; Foundation Law Group

(57) ABSTRACT

The system is an interactive control system that uses multiple control points to manage a user toward a desired state through coaching, feedback, and feed-forward mechanisms. They system uses push and pull from a user to dynamically determine which control points to utilize and emphasize to guide the user to a desired state. The system creates Topics that are generated out of Content Elements. These topics are referenced by Rules and are arranged in a queue so that a planned succession of Topics can be presented proactively to a user in a prioritized and logical manner to guide the user to a desired state. The Rules include Dynamic Rules that allow real time modification of the queue to present Topics relevant to user state and progress toward the desired state.

2 Claims, 10 Drawing Sheets

(56) References Cited

OTHER PUBLICATIONS

International Search Report dated Oct. 31, 2013, regarding PCT/US2013/051132.
International Preliminary Report on Patentability dated Jan. 20, 2015 and Written Opinion dated Oct. 31, 2013, regarding PCT/US2013/051132.
Supplemental European Search Report and Search Opinion dated Jan. 18, 2016, regarding EP13819834.6.

* cited by examiner

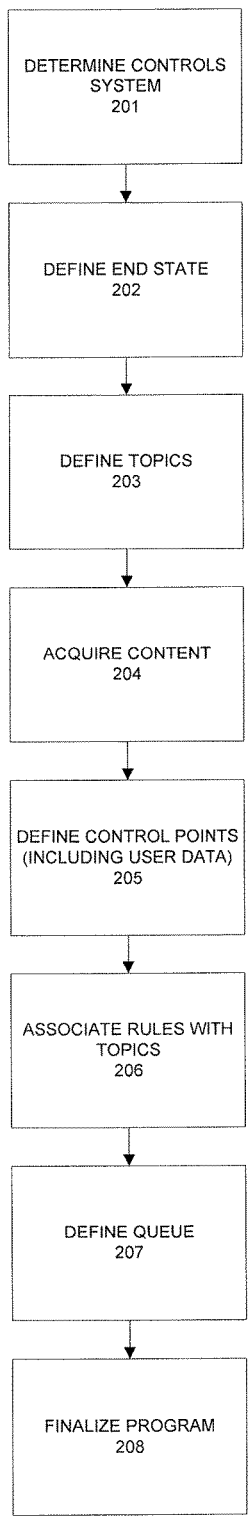
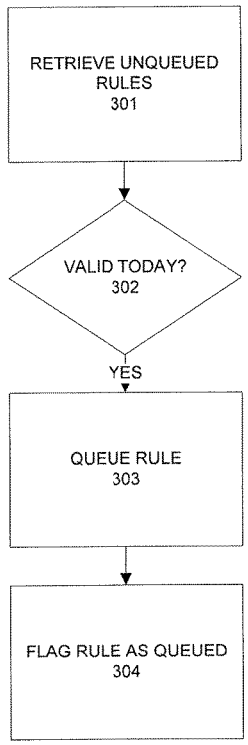
FIGURE 3
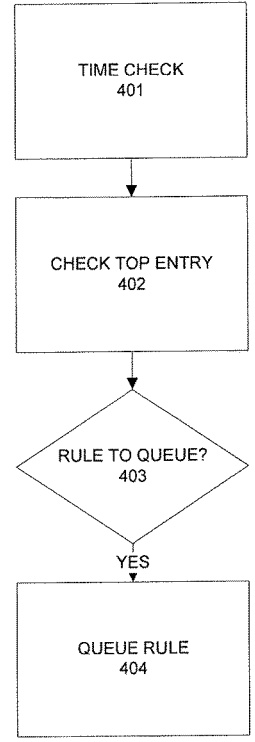
FIGURE 4
FIGURE 2

METHOD AND APPARATUS FOR UTILIZING CONTROL POINTS TO MANAGE A USER TO A DESIRED STATE

This patent application claims priority to U.S. Provisional Patent Application No. 61/673,189 filed on Jul. 18, 2012 and incorporated by reference herein in its entirety.

BACKGROUND

There have been a number of attempts to use computer programs to aid a user in achieving a desired goal. Such approaches relate to self-improvement (e.g. exercise, weight loss, self-esteem, self-actualization, and the like), recovery (e.g. 12 step programs, stop smoking, and the like), and health management (e.g. medication reminders, prescription re-fills, and the like). With the advent of smart-phones and processing capable devices such as PDA's, tablet devices, google-glass, and other mobile or wearable computing devices, there has been an attempt to move computer aided assistance capabilities to these mobile devices.

In the prior art, for example, health care professionals have attempted to provide patient management interfaces and applications that can be computer assisted. To date, situations that require monitoring, follow up and ongoing coaching are accomplished via patient/caregiver (e.g. doctor or nurse) communication, either in person or through some other communication. Often, the optimal clinical care path—also referred to as the treatment protocol—for each patient depends on a very narrow set of either objective data (e.g. weight, blood pressure, temperature, blood samples, or other information) or subjective data (pain level, energy level, ability to use a limb, breathing comfort, and the like). Today, unless the patient is in almost daily contact with his caregiver, it is entirely incumbent upon the patient to understand and execute the most appropriate actions based on this narrow set of information. Even this can be time consuming, discouraging, and impractical and may be a burden that prevents the patient from fully and more completely participating in recovery or management of their condition.

In other instances, the patient is provided with a generic "what you can expect" pamphlet associated with the patient's condition, written to explain to the patient what changes might be expected and how to modify behavior in light of the condition. These brochures place the burden entirely on the patient to figure out how to line up their experience with the information presented. In addition, the vast majority of patients are not equipped or sufficiently knowledgeable to figure out how to evaluate their experiences in the context of the clinical care path.

Even where computer aided treatment protocols are used, they have typically been reactive and require significant pre-existing knowledge and insight on the part of the patient. This is largely due to the fact that computer assisted treatment protocols look at only small fraction of the information that is relevant to successfully treating and managing a medical condition. The subset of data is simply collected, logged and transmitted with very little to nothing done with it to make use of it for the patient and to successfully fit it into the broader treatment protocol and condition management. Such systems end up failing to achieve intended goals.

SUMMARY

The system is an interactive control system that uses multiple control points to manage a user toward a desired state. They system uses push and pull from a user to dynamically determine which control points to utilize and emphasize to guide the user to a desired state. The system is an interactive control system that uses multiple control points to manage a user toward a desired state through coaching, feedback, and feed-forward mechanisms. The system creates Topics that are generated out of Content Elements. These topics are referenced by Rules and are arranged in a queue so that a planned succession of Topics can be presented to a user in a manner to guide the user to a desired state. The Rules include Dynamic Rules that allow real time modification of the queue in response to control points to present Topics relevant to user state and progress toward the desired state.

In one embodiment related to health care, the system provides a constructive way to allow a patient to participate intelligently in self-management of his or her own health, in a manner completely consistent with an established evidence-based clinical care path, utilizing a customized and dynamically responsive application that can be used on a mobile device. The system includes the ability to proactively offer relevant information and guidance, process and act upon information from the user, provide tips and explanations based on ongoing patient interactions, and to notify the patient's caregivers automatically when appropriate. By providing custom feedback and coaching to the patient, the patient receives specific assistance in recovery and management of all aspects of the patient's condition. By delivering an intelligent and individually tailored experience for each user to become more knowledgeable and responsive with respect to their healthcare through timely alerts and coaching, users are more likely to create good habits and make decisions that will lead to improved health outcomes.

In one embodiment, the system is embodied on a mobile device and proactively helps the patient self-manage the patient's healthcare. The system's decision-support and alerting capabilities follow an evidence-based clinical pathway designed to provide temporally appropriate information during its use. In addition, the system's interactions incorporate where the patient is on their treatment timeline, accepts all variety of input from the user to dynamically provide responsive information based on objective and subjective conditions. The system is also context sensitive based on the condition, the medication that the patient has been prescribed, environmental conditions, and other information that might be important in assisting in self-management or recovery and maintenance of a patient. In this embodiment, the system will work even when the mobile device is disconnected from the network

BRIEF DESCRIPTION OF THE DRAWINGS

FIG. 2 is a flow diagram illustrating the creation of a control program in one embodiment.

FIG. 3 is a flow diagram illustrating Basic Rule operation in one embodiment.

FIG. 4 is a flow diagram illustrating Repeating Rule invocation in one embodiment of the system.

DETAILED DESCRIPTION OF THE SYSTEM

The system is an evidence-based program in that it can use objective data to present and dynamically modify a sequence of content presentation to a user as part of a control system to guide the user to a desired state. In one embodiment, the system is implemented on a mobile device. The system can operate whether or not the mobile device is connected to a network. When possible, the system can download data that it expects to need in the background when there is a connection. Even in the absence of a connection, the system includes enough onboard information to provide a meaningful experience. Because the system is mobile based and independent, it is scalable to as many users as desired without the need for increasing a central system infrastructure.

Figure 1:
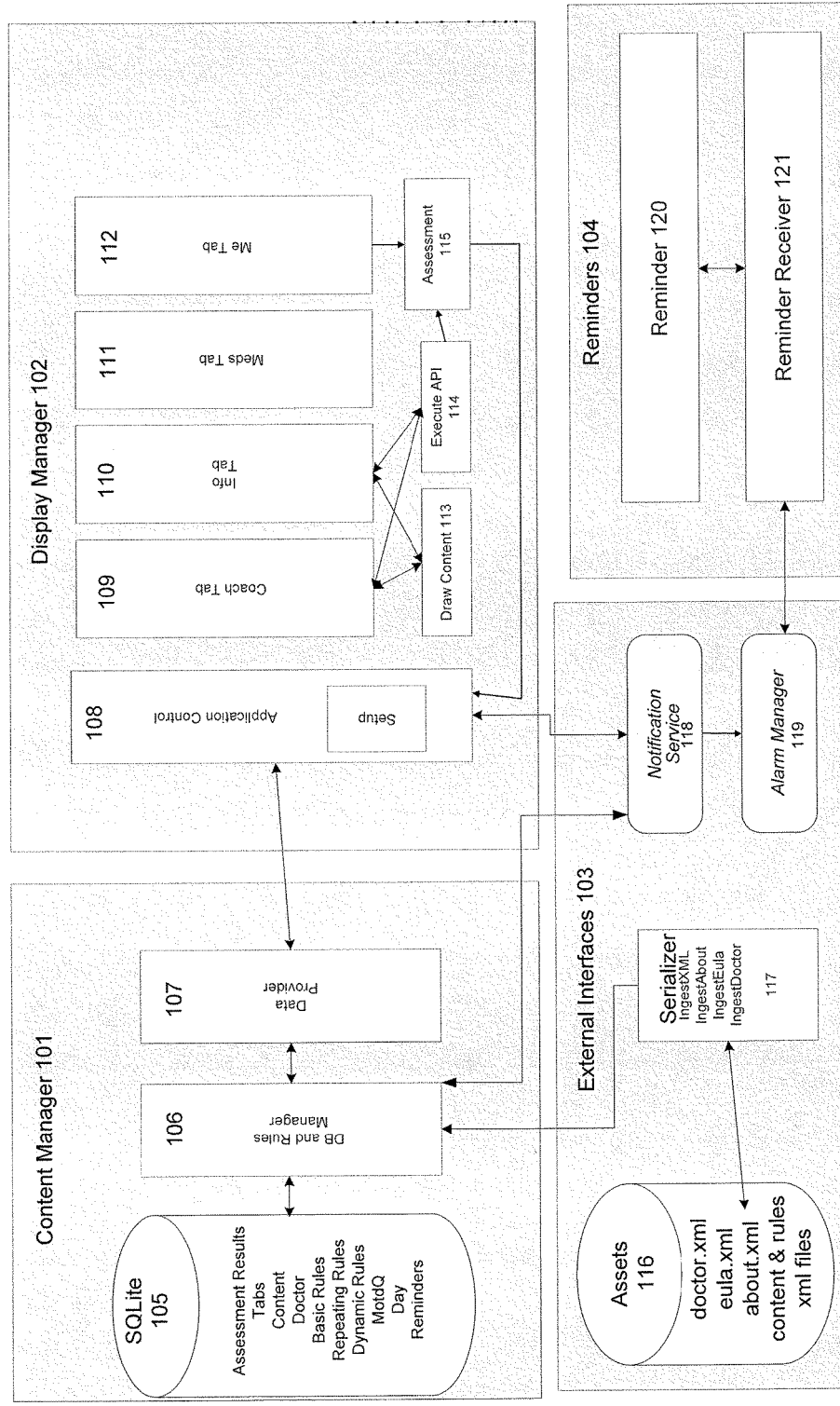
FIG. 1 illustrates an embodiment of the system architecture.

FIG. 1 is an example of the system architecture in one embodiment as implemented on a mobile device. In this embodiment, the system includes a Content Manager 101, Display Manager 102, External Interfaces 103 and Reminders module 104.

The Content Manager 101 is used to manage the storage and delivery of data and information to and from the user. The Content Manager 101 includes a database 105, DB Rules Manager 106, and Data Provider 107. The Database 105 (e.g. an SQL or SQL Lite embodiment) stores data associated with identifying and modifying control points and for implementing rules that use control points and other dynamic communication to guide a user to a desired state. The Database 105 includes a variety of rules (e.g. Basic Rules, Repeating Rules, Dynamic Rules), reminders, informational content, expert information (e.g. Doctors), user data related to control points and other status information, assessment analysis (including historical data), and other relevant information.

The DB and Rules Manager 106 is used to apply intelligence to the Database 105 based on a number of factors, and to select and/or apply one or more rules as appropriate. In one embodiment, the rules can be one of several types. A Basic Rule is a rule that is queued only one time (but could appear many times during the use of the system). Such rules may or may not have an expiration date, depending on their function. The Basic Rules stay in the Rules queue and will cause their associated Topics to appear periodically depending on their position in the queue.

Repeating Rules are rules that are shown periodically and more than once. These rules are generally used for important educational topics that need to be reviewed periodically and that are important for reaching the desired state. Each repeating rule can define its own interval for how frequently it will be repeated or it can use a shared interval that makes it easy to define an educational program by spreading out the topics over a defined interval of time.

The Dynamic Rules are rules that are generated "on the fly" by content and external modules such as assessment results, where it measures the user and compares a current state of the user to a desired state and, if the user is moving away from the desired state, the system responds with the appropriate coaching (using the Dynamic Rules). In one embodiment the content that these rules reference must already exist as part of a defined user pathway, everything else about the Dynamic Rules can be tailored to the specific situation. This provides for a highly responsive user experience as the topics being presented to the user adjust to user actions and/or external events. In one embodiment, when rules are processed, Repeating Rules are processed first, followed by Dynamic Rules and then Basic Rules.

The Data Provider 107 is used to receive data from the user and to output data to the user. If necessary, the Data Provider 107 may format and/or normalize data as appropriate.

The Display Manager 102 is used to manage the user interface and the display on the user device. The Display Manger 102 includes Application Control 108, and a plurality of tabs that may be engaged by the user depending on the application. In one embodiment, the tabs include Coach Tab 109, Info Tab 110, Meds Tab 111 (in a health-related application), and Me Tab 112.

The Application Control 108 provides the interface between the display and the Content Manager 101. This module includes set up information for the user and receives information from Assessment module 115 and provides it to the Content Manager for analysis. The Application Control 108 manages initial setup of the system. This includes making sure that certain required steps are completed, including initial password, EULA, third party setups (e.g. a doctor in a health embodiment), any medication setup, and that the proper program is initialized.

Application Control 108 also controls onscreen tabs and controls switching between the tabs. Communications between the Display Manager 102 and the Content Manger 101 are handled by Application Control 108 and forward information to the tabs as appropriate. If the user has used a notification to enter the application, the Application Control 108 fetches the appropriate topic from the Content Manager and sets the active tab to the Coach Tab 109.

The tabs have local intelligence to provide some dynamic processing. This is important to provide responsiveness to the user. The Coach Tab 109 is where topics are displayed. When a topic is displayed in the Coach Tab, the initial rules processing is taken care of by the Coach Tab itself. The Coach Tab then calls Draw Content 113 to format the topic based on the formatting meta-data and displays the content to the user on the display (e.g. mobile display). If the user takes an action such as hitting a button, the Coach Tab 109 does some preprocessing including handling links and dismissing the current Topic from the appropriate Topics table in the database 105. It then calls Execute API 114 to deal with any actions that may be required (e.g. in a health embodiment, such actions may include call doctor, start assessment, email doctor, etc.)

Content is also displayed in the Info Tab 110, but that content is organized in a hierarchical manner and in one embodiment does not change over time (The Info Tab 110 can be thought of as an FAQ so that users can look up anything they need to about whatever subject the app has been programmed to coach on).

The Meds Tab 111 is where a user can define any medications that the user has been proscribed or is otherwise taking (for a health related control system). The Meds Tab is for both data acquisition and data presentation. The types, dosages, and providers of medications may be managed by the Meds Tab 111, along with medication reminders.

The Me Tab 112 is an interface where the user can enter information about the user's state. This may be through interrogatories promulgated by the system, a reminder from the system to record status, or initiated by the user asynchronously when a status change has occurred or a control point needs to be expressed or modified. The Me Tab 112 provides data to Assessments 115 and also contains a history table of previous assessments that could be forwarded to a third party (e.g. a doctor) if desired.

As can be seen in the diagram, Assessments 115 is called both by Execute API 114 and also the Me Tab 112. There are interfaces in the Me Tab that allow the user to take assessments at any time, as there are cases where a user may be experiencing issues and wants some immediate advice. Notice that once an assessment is completed, it communicates its results back to the Application Control 108, which will first queue a dynamic rule, then reprocess the rules, and finally fetch the next topic. This demonstrates the system modules that carry out the feedback loop from assessment, which can either be initiated by a coaching topic, which includes a system alert/notification, or by the user when needed.

The External Interfaces 103 includes Assets database 116, Serializer 117, Notification Service 118, and Alarm Manager 119. The External Interfaces 103 communicates with third party and/or non-system entities to provide additional assistance in guiding the user to a desired state. In the health management embodiment, the user's doctor is engaged through External Interfaces 103. The system stores contact and communication information for the doctor and allows the user to access the doctor through voice, messaging, email, and the like. The system also allows for the automatic transmission of certain status events collected by the system that may be useful to the doctor in patient management.

The Assets database 116 is coupled to the Content Manager 101 (via DB and Rules Manager 106) through Serializer 117. The Serializer 117 can normalize third party data and put it in a form that can be used by the system. The External Interfaces 103 also includes a notification service 118 that receives input from DB and Rules Manager 106 and Application Control 108. The Notification Service 118 then communicates with the Alarm Manager to calculate appropriate alarms and reminders for the user based on Rules, status and other factors.

Reminders 104 controls the alerts provided by the system. Reminders Tab 104 includes Reminder module 120 and Reminder Receiver 121. Reminders 104 are useful for alerting a user to take some action (e.g. take medicine), to access information via the system, to provide status to the system, and other useful time based information.

Control System Creation

The system provides a dynamic and interactive control system for guiding a user to a desired state. FIG. 2 is a flow diagram illustrating the setup of the system in one embodiment. At step 201 the system the type of control system is determined. This could be health management, maintenance, addiction recovery, personal improvement, weight loss, training, education, and the like. For purposes of example, the following discussion at times refers to an embodiment of the system that implements an asthma management system. It should be noted that this is by way of example only, and the system is not limited to this embodiment. It should also be noted that the desired state may be a fixed and clear result or it could be a state where continued management is needed or desired to maintain the state. In other words, the use of the system does not necessarily end when the desired state is reached.

At step 202 the system defines the end state to which a user should be guided. In asthma management, this end state is a state where the user has effective control over asthma symptoms and treatment, and may be defined as the absence of asthma attacks (or significant reduction in frequency of asthma attacks), positive response to medication, effective technique on various tasks (e.g. inhaler usage), and other measurable that can define a desired end state. In other instances, the desired end state could be fluency in a foreign language, an attained weight goal, an attained performance goal, completion of training, and the like.

In one embodiment, the system operates by presenting a succession of Topics to a user. The Topics are comprised of content elements. Any particular Topic may be comprised of linked content elements and the elements may be textual, audio, visual, graphical, or any combination thereof. The Topics are referenced by Rules. The system can then define collections of Rules that present a succession of Topics to a user in a logical order to steer them toward the desired end state. Instead of being limited to a static presentation, the system is reactive and proactive, dynamically modifying the presentation of Topics in response to user states and evidence based assessments.

At step 203 the system defines the Topics that will be used in the control system. Each Topic can be comprised of one or more content elements. A content element may be associated with one or more Topics as appropriate. In some cases, a Topic may have a plurality of versions, particularly when the Topic is designed to be repeated during the use of the system. By having variations, the system avoids user fatigue or even indifference to the repeated presentation of similar material.

At step 204 the system acquires the content and third party providers that will be used to create Topics for the control system. In the case of asthma coaching, this includes the identification, usage, and warnings for typical prescription and non-prescription medications and supplements, as well as interaction and interference consequences of particular combinations of medications. It also includes collecting information about asthma and asthma management that can be made available to the user through the system. In some cases, third party data, tutorials and informational guides are available and can be accessed as such. In other cases, the content is modified or is original content to provide the required information to the user through Topics. The content is stored as "content elements" that can be linked together as desired.

The content elements may be stored on the mobile device in one embodiment. In another embodiment, some content elements may be called over a network when needed. Some content elements may include anticipated communication with a third party, such as a doctor, advisor, or other expert. In those cases, the content will include a way to initiate the communication, such as telephone, email, text messaging, social media, and the like. In other instances, the system anticipates that content elements that will be needed in the next period of time and loads them in the background so that they will be available when the need arises.

At step 205 the system defines control points that will be used as indicators so that the system can determine if the user is headed toward or away from the desired state. In one embodiment, every user action is considered to be a control point. That is, every click, application use, Topic selection, and communication is a control point. In addition, assessment data, whether from the user, from third parties, or generated by the system based on other information, is considered to be a control point. The system defines control points represented by data that can be acquired from the user that will assist in determining user status and user progress toward the desired state. This information may be acquired passively or actively, and may be generated from specific actions or responses from the user, or may be implied based on actions and states of the user.

In one embodiment of the system control points are related to activity and response as opposed to the absence of activity or response. In some prior art systems, the absence of user feedback is interpreted as advancement toward a goal. In the present system, absence of user activity can be interpreted as a need for communication and possibly, escalation to a member of the patient's caregiving team.

At step 206 the system defines the rules that will control the operation and interaction of the system with the user and associates them with the Topics. As noted above when discussing the system architecture, the rules may be Basic Rules, Repeating Rules, or Dynamic Rules. The Rules are used to determine the queuing of Topics and the order in which they are presented to the user (as well as whether they are presented as an alert, a reminder, an alarm, or passively (e.g. presented when an if the user selects a tab).

At step 207 the system defines a queue of Rules for the presentation of Topics in a preferred order. The initial order of the queue is based on a predicted path from a first state to a desired state. However, the system is dynamic and the order of the queue will change based on metrics and objective data provided through use of the system, through interaction with the user, through data from third parties, and through measurable information associated with the user. This allows the system to provide guidance through feed-forward and feedback At step 208 the system finalizes the control system program.

Rules

The Rules are used to define and modify the order of Topics that are presented to the user during operation of the system. In one embodiment, the system is a time based system, using the notion of a "program day" during which the user is provided a succession of Topics. There is a different queue of Topics for each day of the program, but the Rules can react to actual conditions to modify the queue to dynamically deliver the appropriate topic in response to control points and assessments.

The Rules are comprised of Basic Rules, Dynamic Rules, and Repeating Rules. The various Rules each have a start day and an end day. The system processes the Rules to search for Rules that are valid on the current day. If there are assessments, control points, or other data that invoke a Dynamic Rule, the queue for that day will be reordered on the fly to respond to the new conditions.

Basic Rules

As noted above, a Basic Rule is a rule that is queued only once. A Basic Rule may respond to a particular control point. The control point could be temporally based (e.g. after two weeks, activate a Basic Rule to present content to the user). Many of the Basic Rules are scheduled to be queued on certain program days during the use of the system. Some may be set to be queued based on some activity or accomplishment by the user. For example, a Basic Rule might be triggered the next day after a particular user metric. In that case, the start day and end day of that rule will not be set until the control point has occurred. The control point could also be event based (e.g. initial sign-up by the user, user undertakes some particular action, and the like). In addition the control point could be the status of the user.

FIG. 3 is a flow diagram illustrating the queuing of a Basic Rule in one embodiment of the system. At step 301 the system retrieves unqueued Basic Rules. At decision block 302 the system determines if any of the unqueued Basic Rules are valid at the current time. If so, the system queues the Basic Rule at step 303 and marks the Basic Rule as queued at step 304.

Repeating Rule

FIG. 4 is a flow diagram illustrating the operation of the system in one embodiment for a Repeating Rule. At step 401 the system modifies the date of all of the Repeating Rules to ensure that none of them are in the past. At step 402 the system retrieves the Repeating Rules and checks the top entry of the table and compares the current time and date to the initial timestamp of the top entry. The system can set a fixed interval for all Repeating Rules and then can modify the original time stamp of each rule so that the Repeating Rules appear at different times. In other instances, each Repeating Rule has its own interval definition and the system determines the interval for each Repeating Rule since its last invocation.

At decision block 403 it is determined if there is a Repeating Rule to queue based on the calculated interval. If not, no action is taken. If so, the system proceeds to step 404, queues the Repeating Rule, generates a user notification if one is required for the topic and adds the interval to the start and end days of the rule to move it into the future so it is not immediately requeued.

This embodiment provides a rotation of the Repeating Rules that maximizes state control pursuant to the goals of the system.

Dynamic Rules

Figure 5:
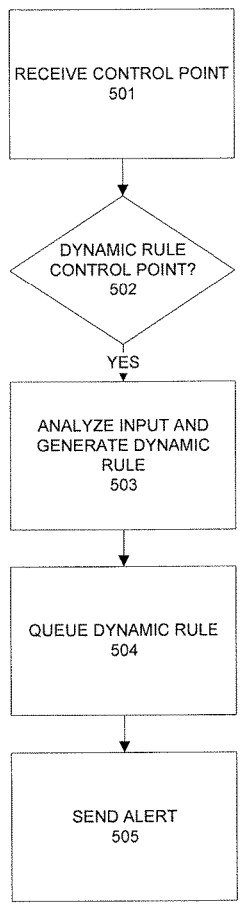
FIG. 5 is a flow diagram illustrating Dynamic Rule operation in one embodiment of the system.

As noted above, Dynamic Rules are rules that are generated and queued dynamically based on state, status, events, control points, assessments, and the like. Based on these events, the system first determines if the user is moving toward the desired state or away from the desired state and responds with an appropriate action. FIG. 5 is a flow diagram illustrating the operation of Dynamic Rules in one embodiment of the system.

At step 501 the system receives a Control Point. This Control Point could be an event, a time, a status, user data, third party data (e.g. doctor), or any other event or user activity that can indicate the state of the user. A typical Control Point that can trigger a Dynamic Rule comes from the Assessment module 115. At decision block 502 the system determines if the Control Point is the type that can trigger a Dynamic Rule. If not, the system stops.

If the Control Point is of the type that can trigger a Dynamic Rule, the system proceeds to step 503 and analyzes the input and uses it to generate the appropriate Dynamic Rule. At step 504 the system queues the Dynamic Rule and, when appropriate, sets its importance to at least one higher than the importance of any other Rule in the queue. At step 505 the system may send a notification to the user's mobile device that allows them to open the system to the Topic associated with the Dynamic Rule.

System Organization

In one embodiment of the system, each type of Rule is stored in its own tables. In addition to a defined interval (where appropriate), each rule can have an associated "Importance" tag. This is a weighting to determine which rule should be invoked if there are two or more rules that might be appropriate for a particular event or control point. In one embodiment, the Importance tag of each rule may be different depending on the state of the user. For example, initially (or at other times) the user may be in an assessment mode. In that condition, some rules may be more important than others and those rules will have a higher importance value. In other conditions, other rules may have higher importance scores. Some Rules may specify that they will be given a higher importance value than any Rule currently queued so that the Rule will go to the top of the queue with a predictable persistence.

The use of the tables allows the system to craft a program designed to guide the user to a desired state. The rules can be ordered in an ideal or high success presentation, with modifications and changes permitted based on actual real world results.

Figure 6:
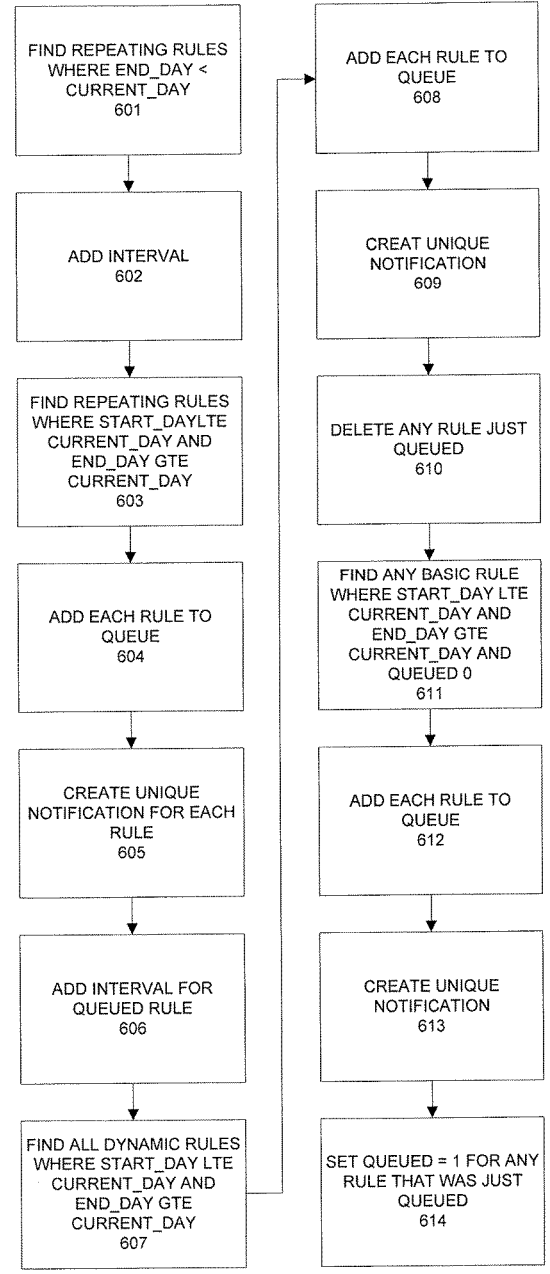
FIG. 6 is a flow diagram illustrating queue management in one embodiment of the system.

When the rules from the table are arranged in an ordered queue, the system process rules as shown in the flow diagram of FIG. 6. The system permits reprocessing during the flow without adversely affecting the queue. In one embodiment of the system, Repeating Rules are processed first, followed by Dynamic Rules and then Basic Rules.

The flow diagram of FIG. 6 shows the generation of a queue for the current day. This can occur at midnight or at any suitable time. After the queue is generated, the system can send the user some combination of alerts and/or ordering of the mobile application of the system. In one embodiment, the system limits mobile device alerts to more important Topics, so that the user is informed that the system should be consulted. Other Topics will be presented when the user opens the mobile client.

At step 601 the system finds any rules where the end_day is less than the current_day. At step 602 the system adds an interval to start_day and end_day until end_day is greater than or equal to current_day. At step 603 the system then finds all Repeating Rules where the start_day is less than or equal to the current_day and the end_day is greater than or equal to the current_day. This step indentifies all Repeating Rules that could be invoked at the current_day.

At step 604 all of these identified Repeating Rules are added to the rules queue. At step 605 the system creates a unique notification to the user mobile device for each rule that defines notifications and was just queued. At step 606 the system adds an interval to start_day and end_day for any rule that was just queued.

At step 607 the system process the Dynamic Rules by finding all Dynamic Rules where start_day is less than or equal to current_day and end_day is greater than or equal to current_day. At step 608 all of these Dynamic Rules are added to the queue.

At step 609 a unique notification is created for each rule that defines notifications and was just queued. At step 610 the system deletes any rules that were just queued.

At step 611 the system finds any Basic Rules where start_day is less than or equal to current_day, end_day is greater than or equal to current_day, and the queue number is equal to 0 (meaning that the Basic Rule has not yet been invoked). At step 612 the system adds each qualifying Basic Rule to the queue. At step 613 the system creates a unique notification for each rule that defines notifications and was just queued. At step 614 the system sets queued equal to 1 for any rule that was just queued. This will prevent the Basic Rules from being invoked more than once.

Topic Fetch

Figure 7:
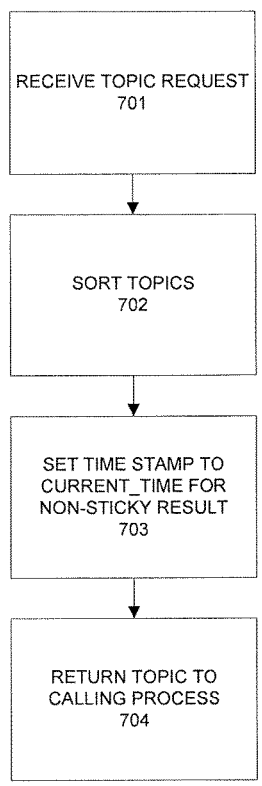
FIG. 7 is a flow diagram illustrating Rule calling in one embodiment of the system.

When a Topic is fetched, there are two possible behaviors taken by the system as shown in FIG. 7. At step 701 the system receives the next Topic request. At step 702 the system sorts through the Topics to find the oldest Topic with the highest importance and oldest timestamp.

Some results are set as "sticky" with granular control for a Rule's persistence. When the result is sticky it is not altered in any way, so all other things being equal (same day, no new dynamic Rules in the system) the sticky result will stay at the top of the queue. The system uses this for important topics that we want the user to act on. When a non-sticky result is fetched at step 703, the timestamp is set to the current time, which moves it behind all others that share the same importance. This provides variety to the user. This can be useful for filler content which is displayed to the user when all important and/or sticky Topics have been dealt with. At step 704 the Topic (and associated content segments) is returned to the calling process.

Coaching

The system moves the user toward a desired state through "coaching". Coaching is the presentation of appropriate topics at pre-planned or responsive times to guide the user along a path of control points to the desired state. In one embodiment the system includes a way for the user to invoke coaching when using the system. This is typically by invoking the Coach tab 109.

Figure 8:
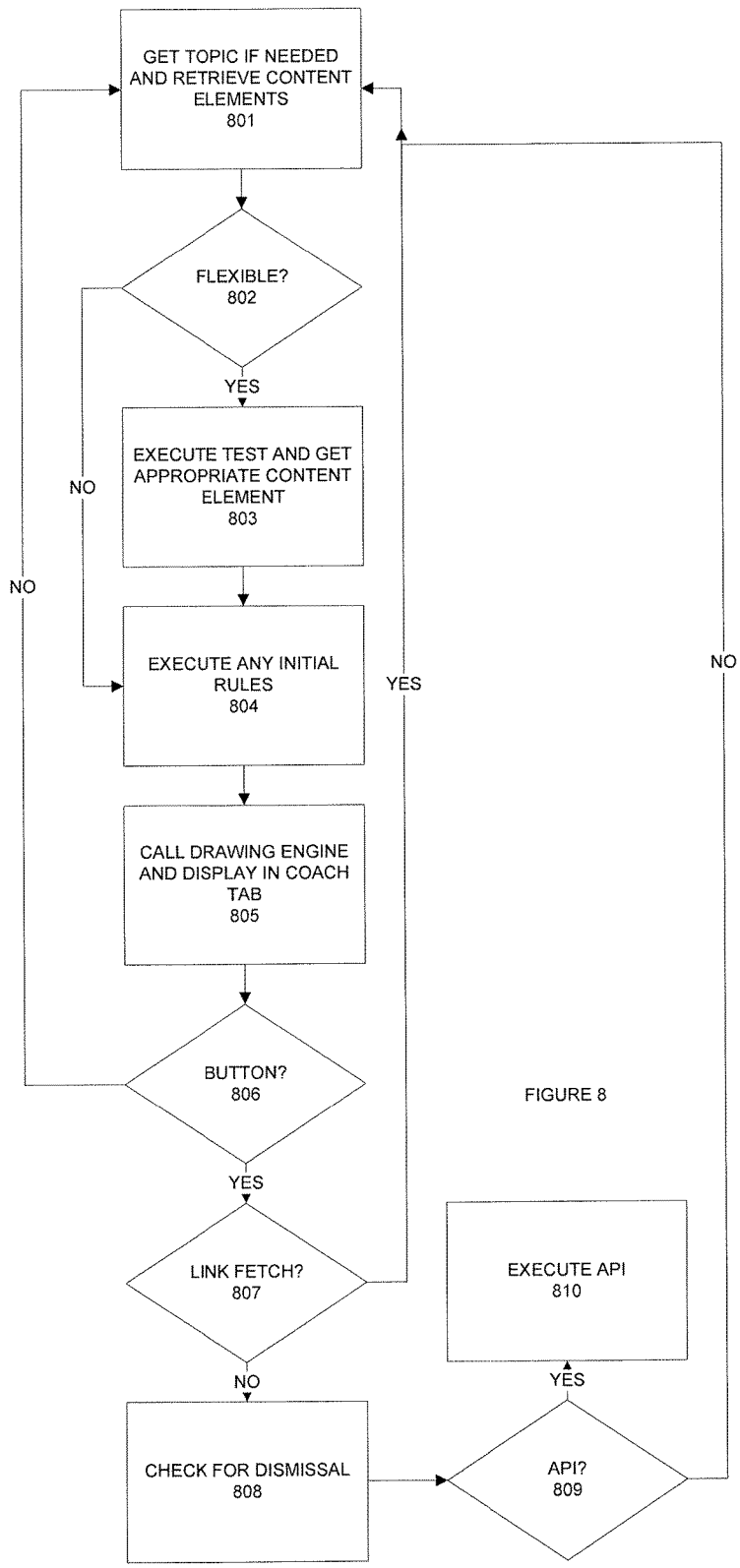
FIG. 8 is a flow diagram illustrating Coaching Tab operation in one embodiment of the system.

FIG. 8 is a flow diagram illustrating the operation of the Coach Tab in an embodiment of the system. When the Coach tab is being displayed, it first checks to see if it has an active Topic. If it does not have an active Topic, it fetches one from the Topic queue. Once it has an active Topic, it fetches the content element to which the Topic points at step 801. In one embodiment there are three content types, "info", "list" and "flexible." All of these content types are objects that inherit from a common type, which is an "abstract content." While scriptwriters and users will never see an "abstract content" it is important to understand that all of the content types can share fields. By way of example, the system refers to the fetched content as a content element.

Content elements contain text to display to the user along with meta-data. There is meta-data containing formatting information, and also meta-data that contains rules and APIs that the user can execute. At decision block 802 the system checks to see if the content is the flexible type. The "flexible" content type is different because it is not actually displayed to the user. It contains a test and several choices and is used to tailor a topic based on previous system settings. For example, the system may periodically remind the user to set up medicine reminders if none have been defined, or give the user advice on how to make reminders more effective by connecting them to other behaviors. When a flexible is fetched, the test is executed and new content element is fetched at step 803.

When an info or list is fetched, the initial rules are processed at step 804 (because the act of viewing a topic is a Control Point). Next, the drawing engine is called at step 805 to format the view (including buttons, list items, and click handlers) and then the content is displayed to the user.

At decision block 806 the system checks to see if the user hits a button or selects a list item on the content. If not, the system returns to step 801. If so, the system next checks to see what kind of action is invoked by the system. At decision block 807 the system determines if the button is a link fetch. If so, the system fetches a new content element at step 801. If not, the system proceeds to step 808 and checks for dismissal to see if the Topic is one that the system has designated as having been "acted on" and if it is, the system removes the Topic from the queue.

The system determines if the button invokes an API at step 809. APIs include things such as launching an assessment, calling or emailing a doctor, or running one of the different setup views. If there is an API at step 809, the system executes the API at step 810. If not, the system returns to step 801.

By having multiple paths through a given topic, the program is tailored to the user. A good example are the topics that are displayed after the user takes an assessment, where it is necessary to determine how the user is doing with respect to a particular Topic and make recommendations as to whether or not they should seek help or use an existing action plan.

There are some optional initial rules in content elements such as a rule that queues a Dynamic Rule and a rule that tells the queue to remove the current Topic. An example of where the system queues an initial dynamic Rule is in the assessment results, where the system may queue a follow-up for the next day to see how the user is doing if their assessment result was not on path. An example of where the system would remove the current Topic is where there is a sticky Rule and the user has selected a path that, from a program perspective, tells us they have "acted on" the topic. The system still displays the content they are looking at and will follow additional links they hit, but the system wants to make sure the Topic is not repeated the next time they enter the client, which is the default behavior for sticky Topics.

Assessment

Figure 10:
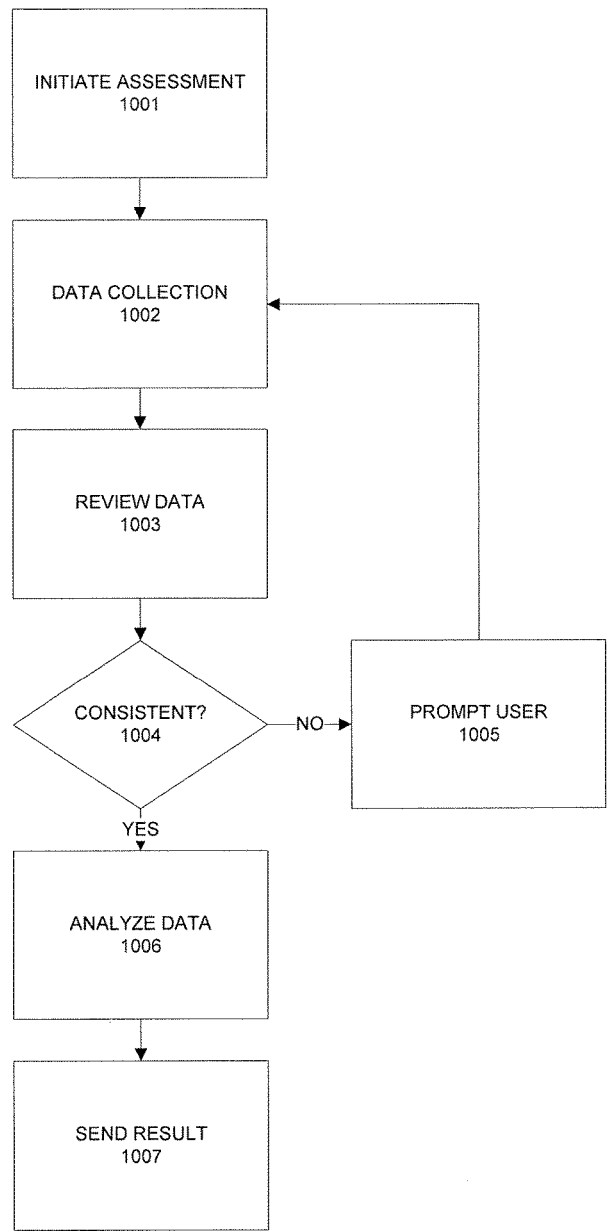
FIG. 10 is a flow diagram illustrating an assessment operation in an embodiment of the system.

FIG. 10 is a flow diagram illustrating the collection of assessment information in one embodiment of the system. At step 1001 the system initiates the assessment. This may be initiated by the user, it may be in response to an alert or calendar reminder by the system, or it may be prompted by other factors related to user state. At step 1002 the system initiates the data collection procedure. This may take one or more of many forms. For example, the system could provide the user with a series of questions related to the status of the user. The system could request objective data or evidence such as user vitals (temperature, blood pressure, and the like).

At step 1003 the system reviews the data to make sure it is consistent with itself and other system parameters. At decision block 1004 the system determines if the assessment data is consistent. If not, the system prompts the user at step 1005. This prompt may take the form of an explanation of the inconsistency. This may be a Topic generated by a Dynamic Rule being triggered by the inconsistency. After the user prompt, the system returns to step 1002.

If the data is consistent at step 1004, the system proceeds to step 1006 and provides the data for analysis via Assessment module 115 and Application Control 108. At step 1007 the result of the assessment is sent to the Content Manager 101. The assessment result could trigger a Dynamic Rule depending on the result.

Control Test

The system uses the results of user assessment of FIG. 10 in determining the queue order and the implementation of dynamic rules in the system. The assessment can be system driven (e.g. a regularly scheduled assessment request, event driven assessment request) or it can be user driven, such as when the user determines to do or report an assessment.

In one embodiment the system implements control tests for Long Term State (e.g. state over prior 28 days), Short Term State (e.g. state over prior 24 hours), Objective Data State (in a health management embodiment, this may be reporting of metrics such as temperature, blood pressure, asthma peak flow meter reading, and the like), Adherence to Coaching and best practices (e.g. medication usage, proper inhaler technique, trigger avoidance, task completion, and the like).

Figure 9:
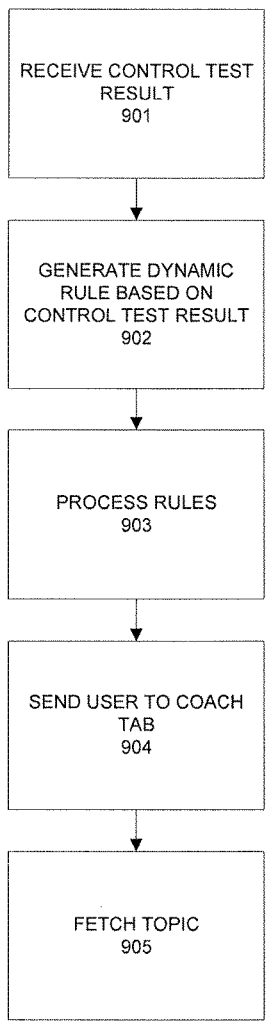
FIG. 9 is a flow diagram illustrating Control Test operation in one embodiment of the system.

FIG. 9 is a flow diagram illustrating the operation of the system in response to a Control Test. At step 901 the system receives the Control Test Result from the user (or from any other appropriate source) such as described in FIG. 10. At step 902 the system generates a Dynamic Rule based on the Control Test Result. This may be accomplished as described in connection with FIG. 5 in one embodiment.

At step 903 the system processes the Rules and sends the user to the Coach tab at step 904. At step 905 the system fetches a Topic for displaying to the user in the Coach Tab.

Asthma Coach

The operation of the system can be described in conjunction with a particular condition, such as asthma. It should be understood that the system has equal application to other conditions, whether chronic, temporary or lifestyle change, and should not be limited in spirit or scope to this example.

The system in one embodiment seeks to promote good habits, provide knowledge, inform and manage expectations, and to build confidence in the user of the user's ability to self-manage the user's condition. Each user will be different, and so the system is dynamically modified to reflect each user's progress.

For example, the system will assume the need to provide certain information to a user in the beginning of treatment. Even so, the system will perform differently for different users based on feedback from the user. The system will initially provide a certain amount of information to the user with an offer of more information if desired. If the user elects to receive more information initially, the system may not provide that additional information later. Conversely, that additional information may be provided later to a user that did not request it initially.

Figure 11:
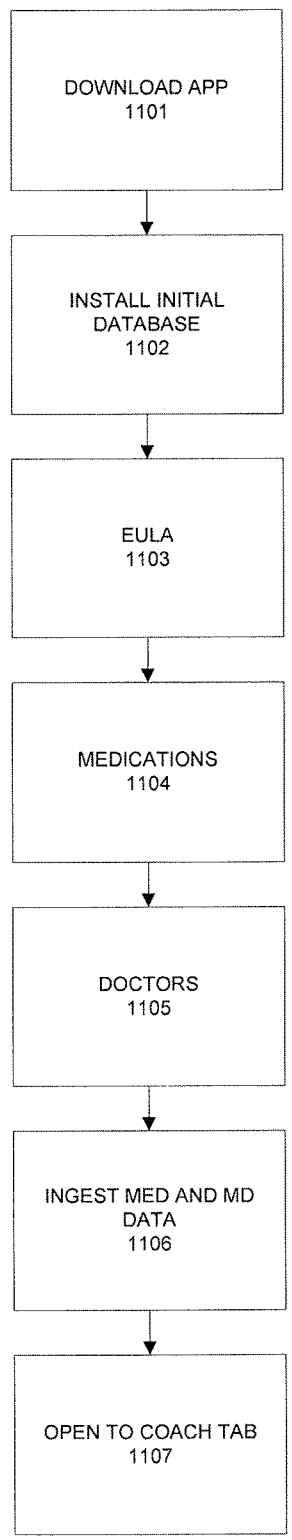
FIG. 11 is a flow diagram illustrating the initialization of an asthma coaching program in an embodiment of the system.

FIG. 11 is a flow diagram illustrating the installation of the system overall operation of the system over time for a user with Asthma. During the initialization process, the system will customize based on user responses. For example, if a particular user response precludes certain other elements, the system will not ask for those other elements. Conversely, if a user response is such that another component is typically linked to that response, the system will request that information.

At step 1101 the user initiates download of the application to a mobile device. At step 1102 the system installs a starting database from the Assets database 116. The starting database is a subset of the full database so the system can load more quickly, providing an enhanced user experience. At step 1103 the system provides a EULA to a user and confirms user acceptance.

At step 1104 the system queries the user as to the medications and inhalers that the user is currently using. It should be noted that when the user selects a particular medication, other medications will be automatically eliminated because the system knows that the use of certain medicines preclude the use of others. Additionally, certain medicines imply the cooperative use of other medicines, of which the system is also aware and presents those medications for selection by the user. The system assumes that the user will have a rescue inhaler, and provides possible inhalers from which the user identifies the correct one. The system has a database of medications that includes the text of warning labels, side effects, recommended methods of use (e.g. with food, at morning, at night, etc.) and provides explanations to the user about the intended goal of the medication and how to use it. The system also asks the user for the dosage schedule.

At step 1105 the system queries the user for the doctors treating the user. In many cases, the doctors may be in a system database and the system will offer suggestions to the user. In other instances, the user is able to provide name, affiliation, and contact information for the user's doctor.

At step 1106 the system ingests additional data based on the user's responses in steps 1104 and 1105. At step 1107 the system opens the mobile client and starts the user at the Coach Tab for the first Topic.

In the case of asthma, there are certain devices and rescue tools that may be part of the management, in particular the use of inhalers. The system includes a database on the inhalers that may be recommended to a user and can provide information to the user based on the inhaler identified in the setup. After installation, the system provides a tutorial to the user on how to use the particular inhaler. Some inhalers are used regularly, while others may be for rescue or emergency situations, such as when the user is having an asthma attack and needs rapid relief.

The system will provide knowledge to a user based on a number of conditions and parameters. For example, if the user has shown an interest in fuller descriptions by consistently clicking "more info" buttons on the system, the system will more frequently provide information to that user. In some cases, information will not be relevant at certain stages of the management process. For example, certain side effects may not show up until some time period after beginning a medication. The system can calendar that and provide information to the user about the side effects at an appropriate time prior to possible onset of such symptoms.

The system uses an intuitive interface that allows the user to select the most appropriate path in an expedited manner. At all times the user has access to information that has already been presented, allowing the user to review and refresh the user's knowledge.

As noted above, all user actions can be treated as Control Points. For example, if the user access the Info tab and looks at a Topic such as "Asthma Attack", the system will generate a Dynamic Rule that will follow up with the user after some time period (e.g. the next day). The Dynamic Rule may be to the effect of noting that the user was reviewing asthma attacks and asking if the user needs help, or even requesting an assessment at that point. This shows that even passive activities, such as reading a Topic, can generate Dynamic Rules.

Figure 12A:
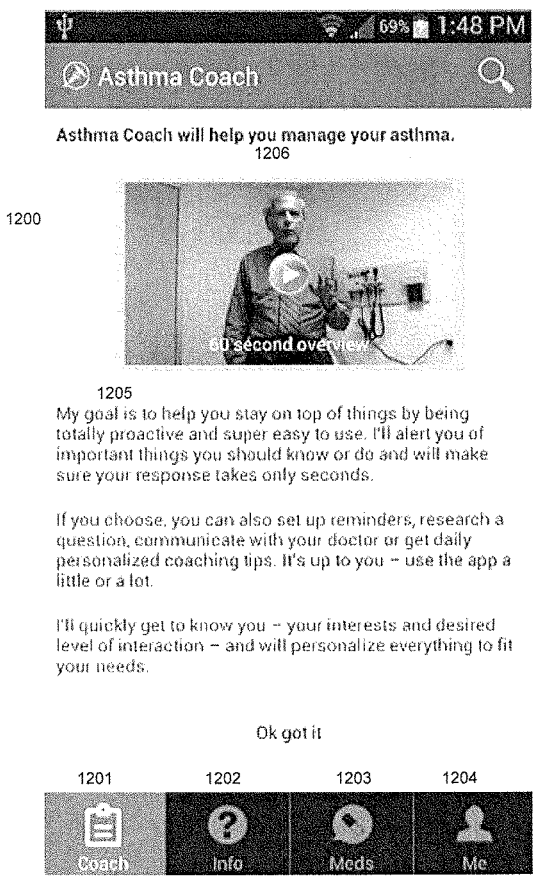
FIG. 12A illustrates a smartphone interface of an embodiment of the system where the Coach Tab is active.

FIG. 12A is an example of an embodiment of the smart-phone interface of the system. The smart-phone 1200 includes a user interface on the display having a number of tabs along the bottom edge for choosing different features of the system. These tabs include Coach 1201, Info 1202, Reminders 1203, and Me 1204.

The Coach tab 1201 is highlighted in the example illustrated. When the user is brought to the Coach 1201 the system proactively presents information and knowledge (via a Topic) that would be useful to the user based on a variety of factors. In one embodiment, the system analyzes the date, time, prior experience of the user in the system, and medication history to provide a suggested coaching presentation upon delivery. In other instances, the user may be presented with a plurality of possible subjects on which to receive coaching. In either event, the system still uses feedback information and other parameters to provide customized information to the user. For example, each subject may have a number of coaching presentations associated with it, and the user will be presented with a different version each time the user selects that subject. The selection may be random, in some predetermined order, or as noted above, based on the particular user experience.

In the example shown, the coaching includes a text region 1205 and a video region 1206. The user can choose to play the video or not as desired. The text region is scrollable so that more information can be provided. In other instances, the coaching information can be on a series of pages selectable by the user.

Figure 12B:
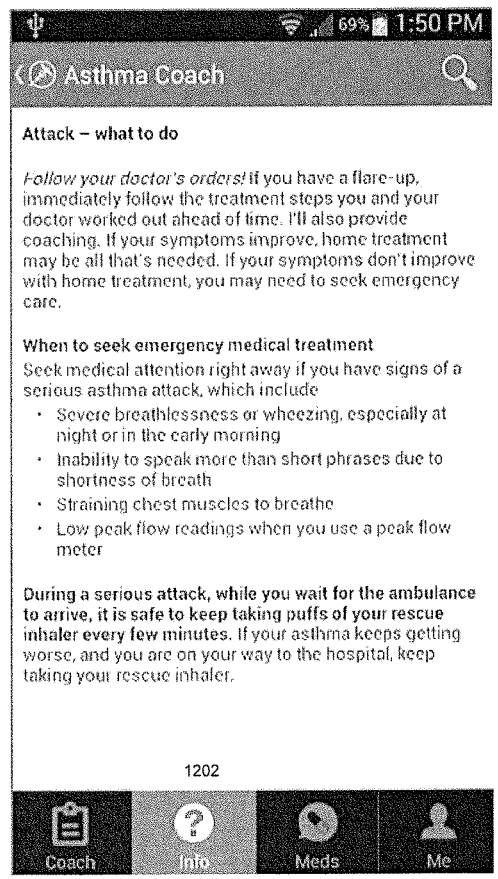
FIG. 12B illustrates a smartphone interface of an embodiment of the system where the Info Tab is active.

FIG. 12B illustrates the interface when the Info 1202 button has been selected or when the system dynamically determines that this information is relevant based on the preceding user interaction. In this tab, the user can obtain information about a number of subjects, including the user's medication, a comprehensive database at the system central processing location, the user's medical devices, and techniques for using equipment. As with the coaching section, the Info Tab 1202 can initially present a context appropriate subject customized for the user, as well as providing a plurality of subjects for consumption by the user. Any of the content on the Info tab can be used to generate dynamic interactions in the future based on a configurable set of business rules.

In the example of FIG. 12B, the user has selected a Topic related to asthma attacks. As noted above, this triggers the generation of a Dynamic Rule that will engage the user and attempt to obtain additional information to see if the user is in distress or needs additional coaching.

Figure 13A:
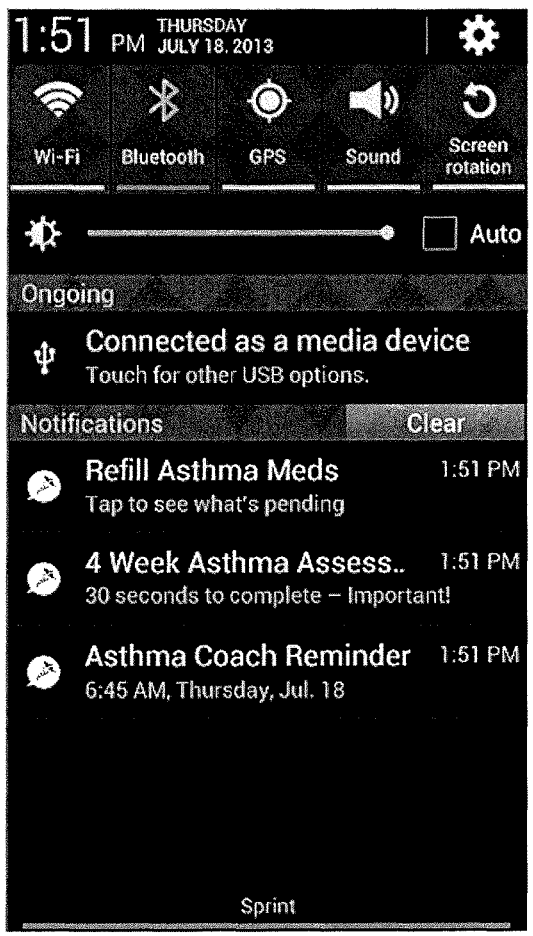
FIG. 13A illustrates a smartphone interface of an embodiment of the system showing a Notification.
Figure 13B:
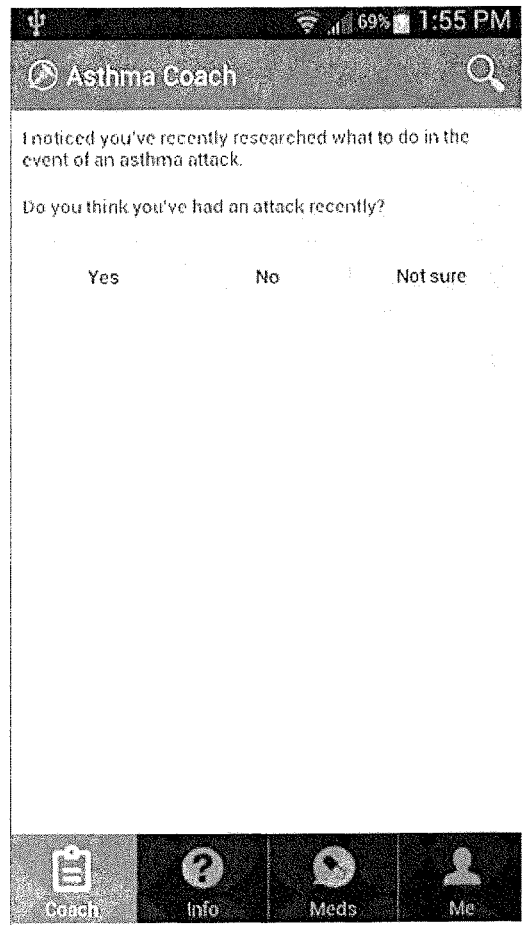
FIG. 13B illustrates a smartphone interface of an embodiment of the system showing a Coaching Topic in response to a Dynamic Rule.

FIG. 13A illustrates a notification that will appear on the user's mobile device letting them know that there is coaching available related to asthma attacks. If the user selects this notification, the user will be taken into the application at the Coach Tab and will be presented with a query as in FIG. 13B. The user response to the query in FIG. 13B is another Control Point that will generate another Dynamic Rule as appropriate, based on the user's state.

Figure 14:
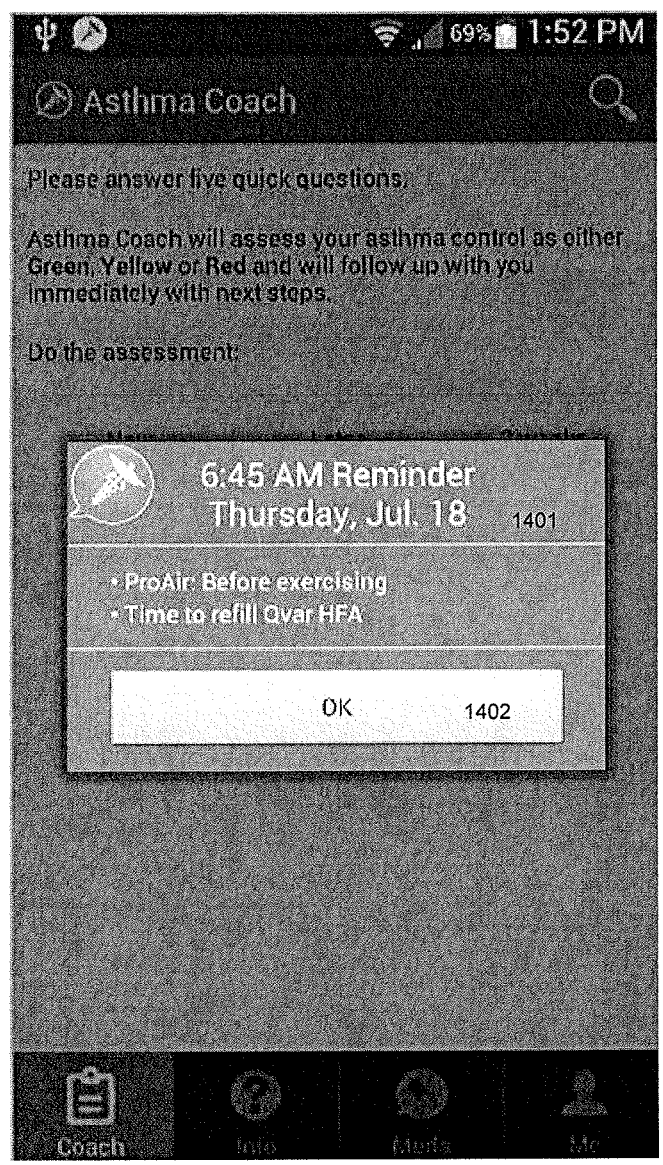
FIG. 14 illustrates a smartphone interface of an embodiment of the system where an alert is presented to the user.

FIG. 14 illustrates an embodiment of the user interface when a reminder has popped up. In this instantiation, the reminder 1401 includes an "OK" button 1402 that may be acknowledged by the user. Whether explicitly acknowledged or not, the user interaction is logged and an appropriate dynamic interaction can be triggered as a result. Reminders can capture a variety of responses including the aforementioned "OK" as well as optional "Took it", "Skipped", "Stop", etc. The system may also request later confirmation by the user as to whether the reminder activity was performed. The system can use this to tailor later reminders to the user based on the participation and compliance of the user, as well as other contextual clues.

Embodiment of Computer Execution Environment (Hardware)

Figure 15:
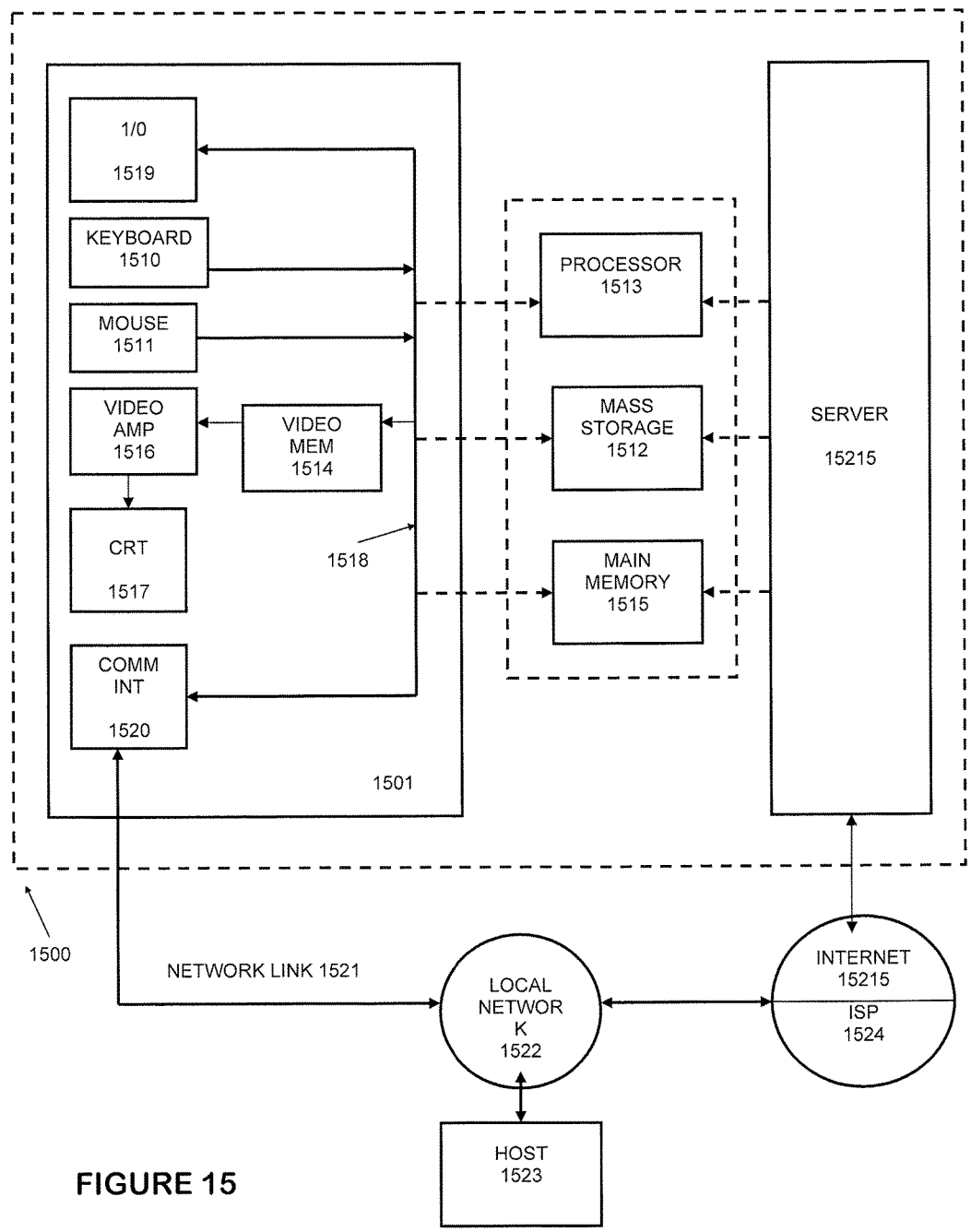
FIG. 15 is an example computer system embodiment of the system.

An embodiment of the system can be implemented as computer software in the form of computer readable program code executed in a general purpose computing environment such as environment 1500 illustrated in FIG. 15, or in the form of bytecode class files executable within a Java™ run time environment running in such an environment, or in the form of bytecodes running on a processor (or devices enabled to process bytecodes) existing in a distributed environment (e.g., one or more processors on a network), or in any suitable language such as Objective C. A keyboard 1510 and mouse 1511 are coupled to a system bus 1518. The keyboard and mouse are for introducing user input to the computer system and communicating that user input to central processing unit (CPU 1513. Other suitable input devices may be used in addition to, or in place of, the mouse 1511 and keyboard 1510. I/O (input/output) unit 1519 coupled to bi-directional system bus 1518 represents such I/O elements as a printer, A/V (audio/video) I/O, etc.

Computer 1501 may be a laptop, desktop, tablet, smart-phone, or other processing device and may include a communication interface 1520 coupled to bus 1518. Communication interface 1520 provides a two-way data communication coupling via a network link 1521 to a local network 1522. For example, if communication interface 1520 is an integrated services digital network (ISDN) card or a modem, communication interface 1520 provides a data communication connection to the corresponding type of telephone line, which comprises part of network link 1521. If communication interface 1520 is a local area network (LAN) card, communication interface 1520 provides a data communication connection via network link 1521 to a compatible LAN. Wireless links are also possible. In any such implementation, communication interface 1520 sends and receives electrical, electromagnetic or optical signals which carry digital data streams representing various types of information.

Network link 1521 typically provides data communication through one or more networks to other data devices. For example, network link 1521 may provide a connection through local network 1522 to local server computer 1523 or to data equipment operated by ISP 1524. ISP 1524 in turn provides data communication services through the world wide packet data communication network now commonly referred to as the "Internet" 15215 Local network 1522 and Internet 15215 both use electrical, electromagnetic or optical signals which carry digital data streams. The signals through the various networks and the signals on network link 1521 and through communication interface 1520, which carry the digital data to and from computer 1500, are exemplary forms of carrier waves transporting the information.

Processor 1513 may reside wholly on client computer 1501 or wholly on server 15215 or processor 1513 may have its computational power distributed between computer 1501 and server 15215. Server 15215 symbolically is represented in FIG. 15 as one unit, but server 15215 can also be distributed between multiple "tiers". In one embodiment, server 15215 comprises a middle and back tier where application logic executes in the middle tier and persistent data is obtained in the back tier. In the case where processor 1513 resides wholly on server 15215, the results of the computations performed by processor 1513 are transmitted to computer 1501 via Internet 15215, Internet Service Provider (ISP) 1524, local network 1522 and communication interface 1520. In this way, computer 1501 is able to display the results of the computation to a user in the form of output.

Computer 1501 includes a video memory 1514, main memory 1515 and mass storage 1512, all coupled to bi-directional system bus 1518 along with keyboard 1510, mouse 1511 and processor 1513.

As with processor 1513, in various computing environments, main memory 1515 and mass storage 1512, can reside wholly on server 15215 or computer 1501, or they may be distributed between the two. Examples of systems where processor 1513, main memory 1515, and mass storage 1512 are distributed between computer 1501 and server 15215 include thin-client computing architectures and other personal digital assistants, Internet ready cellular phones and other Internet computing devices, and in platform independent computing environments, The mass storage 1512 may include both fixed and removable media, such as magnetic, optical or magnetic optical storage systems or any other available mass storage technology. The mass storage may be implemented as a RAID array or any other suitable storage means. Bus 1518 may contain, for example, thirty-two address lines for addressing video memory 1514 or main memory 1515. The system bus 1518 also includes, for example, a 32-bit data bus for transferring data between and among the components, such as processor 1513, main memory 1515, video memory 1514 and mass storage 1512. Alternatively, multiplex data/address lines may be used instead of separate data and address lines.

In one embodiment of the invention, the processor 1513 is a microprocessor such as manufactured by Intel, AMD, Sun, etc. However, any other suitable microprocessor or microcomputer may be utilized, including a cloud computing solution. Main memory 1515 is comprised of dynamic random access memory (DRAM). Video memory 1514 is a dual-ported video random access memory. One port of the video memory 1514 is coupled to video amplifier 1519. The video amplifier 1519 is used to drive the cathode ray tube (CRT) raster monitor 1517. Video amplifier 1519 is well known in the art and may be implemented by any suitable apparatus. This circuitry converts pixel data stored in video memory 1514 to a raster signal suitable for use by monitor 1517. Monitor 1517 is a type of monitor suitable for displaying graphic images.

Computer 1501 can send messages and receive data, including program code, through the network(s), network link 1521, and communication interface 1520. In the Internet example, remote server computer 15215 might transmit a requested code for an application program through Internet 15215, ISP 1524, local network 1522 and communication interface 1520. The received code maybe executed by processor 1513 as it is received, and/or stored in mass storage 1512, or other non-volatile storage for later execution. The storage may be local or cloud storage. In this manner, computer 1500 may obtain application code in the form of a carrier wave. Alternatively, remote server computer 15215 may execute applications using processor 1513, and utilize mass storage 1512, and/or video memory 1515. The results of the execution at server 15215 are then transmitted through Internet 15215, ISP 1524, local network 1522 and communication interface 1520. In this example, computer 1501 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. In other embodiments, the system may be implemented on any suitable computing environment including personal computing devices, smart-phones, pad computers, and the like. An embodiment of the invention may be implemented in any type of computer system or programming or processing environment.

What is claimed is:

1. A method of providing behavioral control comprising:
in a processing system on a mobile device;

defining a User Pathway that includes defining a plurality of Control Points representing actions and states of the user, wherein each of the plurality of Control Points is an indicator of whether a user is heading towards or away from a desired state;

defining a plurality of Rules, each of which references a Topic;

defining a plurality of dynamic Rules which represent a subset of the Control Points and are expressed in Meta-Data contained in Content Elements;

defining a plurality of Topics related to the User Pathway for guiding a user to the desired state, where each Topic is comprised of one or more Content Elements, wherein the plurality of Topics are presented to the user in a coaching program;

defining a plurality of Content Elements that contain text to display to the User, some of which include Meta-Data for the dynamic Rules wherein a User interaction with a Content Element triggers a dynamic Rule in at least one Content Element of the plurality of Content Elements;

defining a Queue of Rules that contain a subset of the plurality of Rules in an initial preferred order for controlling the order of presentation of the plurality of Topics;

the processing system on the mobile device automatically and dynamically changing the Queue of Rules to a new order and new subset of the plurality of Rules in response to the interaction;

causing the presentation of at least one of the plurality of Topics in an order based on the new order of the Queue of Rules;

wherein the User State and a dynamic Rule are generated via the user completing an Assessment;

wherein the User State is generated in response to a query that is embedded in a Content Element;

wherein the Content Element contains only Meta-Data for a Control Point and executes a Control Test that evaluates the User State and generates the dynamic Rule; and wherein the Control Test is based on a User State at a plurality of times and generates a dynamic Rule based on the User State at one or more of the plurality of times.

2. The method of claim 1 wherein the Content Elements are textual, audio, visual, graphical, or any combination thereof.

* * * * *